United States Patent
Byrd

(10) Patent No.: US 9,665,909 B2
(45) Date of Patent: May 30, 2017

(54) TRANSACTION CLASSIFICATION RULE GENERATION

(75) Inventor: Christopher Byrd, New Milford, CT (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 331 days.

(21) Appl. No.: 12/906,460

(22) Filed: Oct. 18, 2010

(65) Prior Publication Data

US 2012/0096004 A1    Apr. 19, 2012

(51) Int. Cl.
*G06F 17/30* (2006.01)
*G06Q 40/04* (2012.01)

(52) U.S. Cl.
CPC .................. *G06Q 40/04* (2013.01)

(58) Field of Classification Search
CPC ........................................ G06Q 40/04
USPC ........................................... 707/740
See application file for complete search history.

(56) References Cited

U.S. PATENT DOCUMENTS

| | | | |
|---|---|---|---|
| 6,341,369 B1 * | 1/2002 | Degenaro | G06Q 10/10 706/47 |
| 6,826,576 B2 * | 11/2004 | Lulich et al. | 707/740 |
| 6,925,452 B1 | 8/2005 | Hellerstein et al. | |
| 7,937,392 B1 * | 5/2011 | Nethi et al. | 707/737 |
| 8,051,163 B2 * | 11/2011 | Ruiz et al. | 709/224 |
| 2006/0116919 A1 | 6/2006 | Homann et al. | |
| 2007/0179822 A1 | 8/2007 | Benayon et al. | |
| 2007/0266148 A1 * | 11/2007 | Ruiz et al. | 709/224 |
| 2007/0266149 A1 * | 11/2007 | Cobb et al. | 709/224 |
| 2008/0249940 A1 * | 10/2008 | Hahn-Carlson | G06Q 10/10 705/44 |
| 2009/0164270 A1 * | 6/2009 | Seidman | 705/7 |
| 2010/0088404 A1 * | 4/2010 | Mani et al. | 709/224 |
| 2010/0153261 A1 * | 6/2010 | Tseng et al. | 705/39 |
| 2010/0191624 A1 * | 7/2010 | Sharir et al. | 705/30 |
| 2010/0191634 A1 * | 7/2010 | Macy et al. | 705/35 |
| 2011/0022707 A1 * | 1/2011 | Bansal et al. | 709/224 |
| 2011/0283270 A1 * | 11/2011 | Gass | G06F 8/71 717/168 |

(Continued)

FOREIGN PATENT DOCUMENTS

WO    WO-0118713 A1    3/2001

OTHER PUBLICATIONS

Ken Nozaki, Hisao Ishibuchi, "Adaptive Fuzzy Rule-Based Classification Systems", Aug. 1996, IEEE, pp. 238-250.*

(Continued)

*Primary Examiner* — Apu Mofiz
*Assistant Examiner* — Jared Bibbee

(57) ABSTRACT

A method, executed by a processor, for generating a transaction classification rule that can be applied to unclassified transactions. The method includes receiving an identification of an existing unclassified transaction upon which the classification rule will be based; generating identification rules to identify subsequent unclassified transactions as similar to the existing unclassified transaction; generating the classification rule using the identified transaction; and storing the classification rule for application to the subsequent unclassified transactions. Application of the generated classification rule to the subsequent unclassified transactions produces transactions classified according to the classification rule.

20 Claims, 6 Drawing Sheets

(56) References Cited

U.S. PATENT DOCUMENTS

2012/0016983 A1\* 1/2012 Ruiz et al. .................. 709/224
2012/0158558 A1\* 6/2012 Hahn-Carlson et al. ....... 705/30

OTHER PUBLICATIONS

Omar H. Karam et al., "Classification Rules for Pre-Analysis Filtering of Web Transactions", 2006, IEEE, pp. 764-770.\*

\* cited by examiner

FIG. 5

TRANSACTION TRACING RULE WIZARD FOR SERVLETS — 410

INTRODUCTION
SELCT A TRANSACTION
CLASSIFY THE TRANSACTION
SPECIFY THE SERVLET NAME OR URL
FIND A TRANSACTION
SPECIFY THE HOST
SPECIFY THE APPLICATION SERVER
SPECIFY THE WEB APPLICATION
SPECIFY THE REQUEST PARAMETERS
SPECIFY THE SERVLET DATA
SET TRANSACTION METRICS
SET TRANSACTION STATE AND RESULTS
SET TRANSACTION VALUE
MEP TRANSACTION DATA
> FROM REQUEST PARAMETERS
FROM SERVLET DATA
PUBLISH SERVLET DATA
PUBLISH BPI EVENT
SUMMARY — 412

FROM REQUEST PARAMETERS
SELECT ANY REQUEST PARAMETER HEADER OR ATRIBUTE THAT YOU WANT TO MAP TO THE TRANSACTION INSTANCE.
● SHOW DATA FOR SELECTED TRANSACTION    ○ SHOW DATA FOR SELECTED EVENT

SET TRANSACTION DATA FROM SERVLET PARAMETERS — 414
CHOOSE PARAMETERS

| * | TYPE | NAME | VALUE |
|---|---|---|---|
| | RESPONSE HEADER | ORDERREGION | MIDDLE |
| | PARAMETER | ACCOUNT | MID210001 |
| | RESPONSE HEADER | ORDER STATUS | EXECUTED |
| | REQUEST HEADER | COOKIE | JSESSIONID-0000 |
| | PARAMETER | ACTION | PLACEORDER |
| | PARAMETER | BALANCE | |
| | PARAMETER | DELAY | |
| | PARAMETER | ISSUE | T-NOTE |
| | PARAMETER | MARGINRATIO | 0 |
| | PARAMETER | MATURITY | 3 |
| | PARAMETER | ORDERID | 000000123689EE2079 |
| | RESPONSE HEADER | ORDERRESORT | NORMAL |
| | RESPONSE HEADER | ORDERTYPE | CASH |

TRANSACTION DATE PATH — 416
Q ▼ TYPE HERE TO ENTER

| USED BY SERVICE | |
|---|---|
| TRADE SERVLET, MAIN JSP | LOCATION ID |
| STATUS JSP, TRADE SERVLET, /MA... | LABEL |
| TRADE SERVLET, MAIN JSP | EXCEPTION |
| /STATUS JSP, TRADE SERVLET, /MA... | DO NOT TRANSFER VALUE |
| /STATUS JSP, TRADE SERVLET, /MA... | DO NOT TRANSFER VALUE |
| /STATUS JSP, TRADE SERVLET, /MA... | DO NOT TRANSFER VALUE |
| /STATUS JSP, TRADE SERVLET, /MA... | DO NOT TRANSFER VALUE |
| /STATUS JSP, TRADE SERVLET, /MA... | DO NOT TRANSFER VALUE |
| /STATUS JSP, TRADE SERVLET, /MA... | DO NOT TRANSFER VALUE |
| /STATUS JSP, TRADE SERVLET, /MA... | CREATE DATA DEFINITION |
| TRADE SERVLET, MAIN JSP | END TIME |
| TRADE SERVLET, MAIN JSP | EVGSUBNETID |
| STATUS JSP, TRADE SERVLET, /MA... | EXCEPTION |
| | LABEL |
| | LOCATION BUILD |

< BACK   NEXT >   FINISH   CANCEL   HELP

| TRANSACTION TRACING RULE WIZARD FOR SERVLETS | ⌧ |
|---|---|
| INTRODUCTION<br>SELCT A TRANSACTION<br>CLASSIFY THE TRANSACTION<br>  SPECIFY THE SERVLET NAME OR URL<br>  FIND A TRANSACTION<br>  SPECIFY THE HOST<br>  SPECIFY THE APPLICATION SERVER<br>  SPECIFY THE WEB APPLICATION<br>  SPECIFY THE REQUEST PARAMETERS<br>  SPECIFY THE SERVLET DATA<br>SET TRANSACTION METRICS<br>SET TRANSACTION STATE AND RESULTS<br>  SET TRANSACTION VALUE<br>  MEP TRANSACTION DATA<br>  FROM REQUEST PARAMETERS<br>  FROM SERVLET DATA<br>  PUBLISH BPI EVENT<br>> SUMMARY | SUMMARY<br><br>CLASSIFICATION<br>THIS TRANSACTION CLASSIFIED WHEN:<br>  THE SERVLET IS EQUAL TO "TRADE LOGIN SERVLET"<br>  THE HOST IS EQUAL TO "BYRD8400"<br>  THE APPLICATION SERVER IS EQUAL TO "VMAMQAD1NODE01Cel, VMAMQAD1NODE01, SERVER1"<br>  THE PAREMETER NAMED "ORDERTYPE" MATCHES "CASH"<br>  THE PARAMETER NAMED "PRODUCT" MATCHES "BOND"<br><br>TRANSACTION METRICS<br>  TRANSACTION RESULT WILL BE SET TO FAILED<br>  TRANSACTION STATE WILL BE SET TO PROCESSING<br>  TRANSACTION VALUE WILL BE SET TO THE CONTENTS OF THE PARAMETER NAMED "BALANCE"<br><br>DATA MAPPED TO THIS TRANSACTION<br>  THE TRANSACTION PROPERTY LOCATIONID WILL BE SET TO THE CONTENTS<br>  OF THE REPSONSE HEADER NAMED "ORDERREGION"<br>  THE TRANSACTION PROPERTY EXCEPTION WILL BE SET TO THE CONTENTS OF THE<br>  RESPONSE HEADER NAME "ORDERSTATUS"<br>  THE TRANSACTION PROPERTY LABEL WILL BE SET TO THE CONTENTS OF THE PARAMETER NAMED "ACCOUNT"<br><br>BPI EVENT PUBLISHING<br>  A BPI EVENT CALLED BP/BUSINESSPROCESSABC WILL BE GENERATED WHEN THIS TRANSACTION IS CLASSIFIED. |

420

[ <BACK ] [ NEXT> ] [ FINISH ] [ CANCEL ] [ HELP ]

FIG. 6

TRANSACTION CLASSIFICATION RULE GENERATION

BACKGROUND

Organizations often make use of repetitive transactions in order to accomplish some task or achieve some objective. The transactions typically require data inputs, produce data outputs, and are executed according to a rule set. Optimizing the execution of these transactions, as well as defining the data inputs and use of the data outputs often are goals of the organization. When the transactions are computerized, software programs can be used to assist with achieving these goals. However, such optimization and data definition efforts, even when aided by software, often require a user to have extensive knowledge of the transaction process and data flow paths.

DESCRIPTION OF THE DRAWINGS

The detailed description will refer to the following drawings in which like numerals refer to like objects, and in which:

FIGS. 5 and 6 are example user interface displays generated during the example operation of FIG. 4.

DETAILED DESCRIPTION

Figure 1:
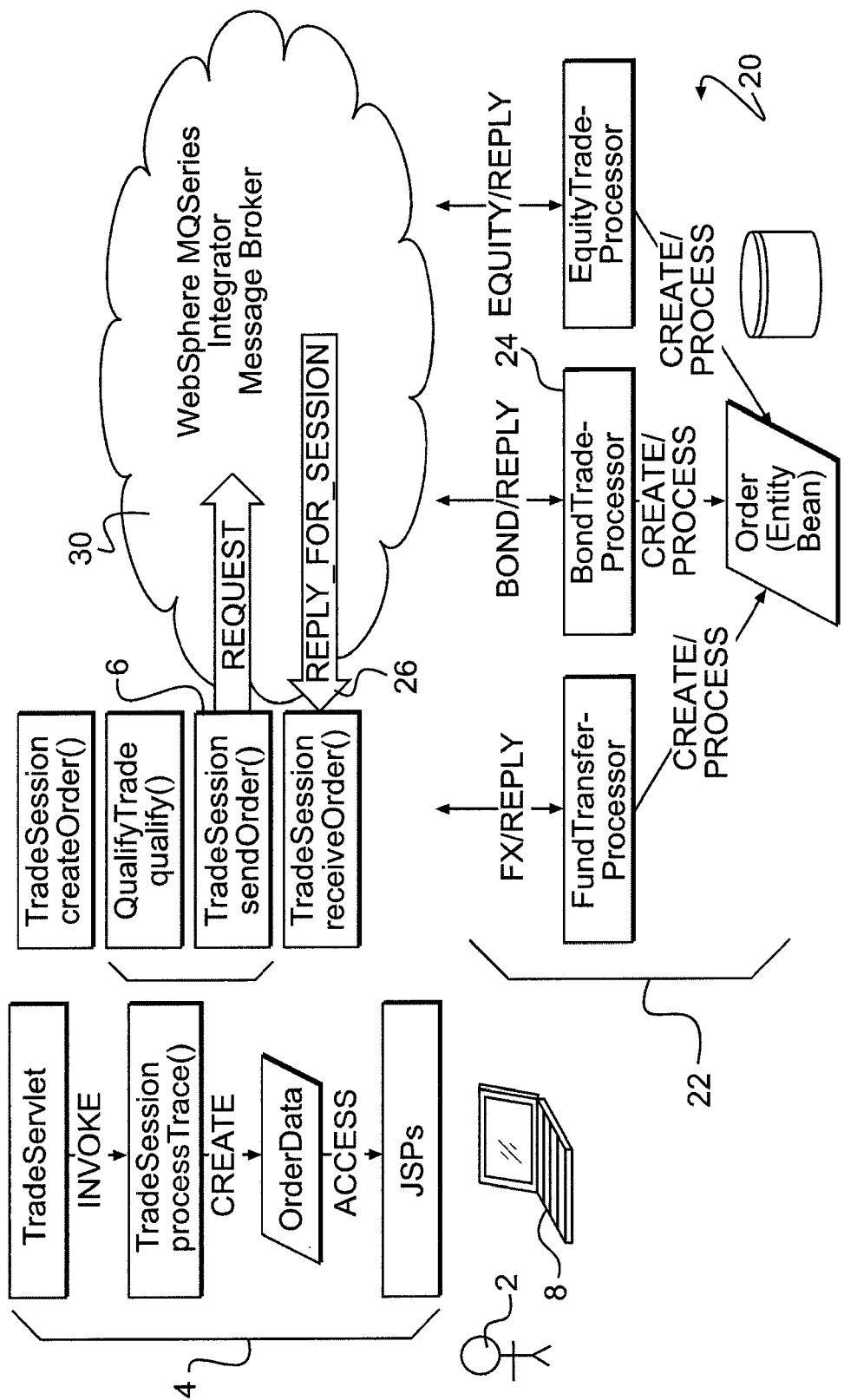
FIG. 1 illustrates a business transaction example.

A system uses transaction and event instance data as a model input to generate transaction classification rules. As used herein, events are objects created by a monitoring agent or data collector. The data collector captures the running state of a process at some execution point for that process. A number of similar events (i.e., event instances) may be correlated, and the correlated events than may be assigned to a transaction class. Transaction classification rules then categorize the transaction instances with specific identities. Events can be generated based on a Java™ class method call, while the running state data is generated from different call parameters. The data then may be assembled into an XML document and stored as such. Additionally, a mapping table containing individual mappings between each piece of running state data and an XML path based signature (e.g., Event/Data/X_Account) can be defined. In either case, any running state data can be identified and referenced using XPath language. In addition, XPath may be used to compute values (e.g., strings, numbers, and Boolean values) from the content of an XML document. Thus, transaction and event instance data are collected and stored in an appropriate data format; relevant information then is extracted from the stored instance and event data, the extracted information is presented to a user to assist the user derive specific classification rules. The classification rules then may be applied to future transaction and event instances.

Disclosed herein is a system and method for transaction classification that overcomes deficiencies in existing business transaction management systems and methods. A transaction classification wizard eliminates the need for a user to know or understand a rule structure or internal Xpath identifications in order to create a rule definition. A flow is created around assisting in building a rule for a specific technology (e.g., J2EE servlets) such that the wizard presents instructions in terms the user understands; i.e., referencing system infrastructure components and custom data payloads that occur in the user's environment. The system and method provide the user the ability to choose a transaction and/or event to model the resulting rule definition on. While the discussion that follows will refer to servlet technology, the same concepts apply to other technologies now existing or to be developed.

A servlet is a Java™ class in Java EE that conforms to the Java™ Servlet API, a protocol by which a Java™ class may respond to HTTP requests. A software developer may use a servlet to add dynamic content to a Web server using the Java platform. The generated content is commonly HTML, but may be other data such as XML. Servlets are the Java™ counterpart to non-Java dynamic Web content technologies such as CGI and ASP.NET. Servlets can maintain state in session variables across many server transactions by using HTTP cookies, or URL rewriting. A servlet API contained in the Java™ package hierarchy javax.servlet, defines the expected interactions of a Web container and a servlet. A Web container is essentially the component of a Web server that interacts with the servlets. The Web container is responsible for managing the lifecycle of servlets, mapping a URL to a particular servlet and ensuring that the URL requester has the correct access rights.

Viewed another way, a servlet is an object that receives a request and generates a response based on that request. The basic servlet package defines Java objects to represent servlet requests and responses, as well as objects to reflect the servlet's configuration parameters and execution environment. The package javax.servlet.http defines HTTP-specific subclasses of the generic servlet elements, including session management objects that track multiple requests and responses between the Web server and a client. Servlets may be packaged in a WAR file as a Web application.

The herein disclosed system and method can be used to define the identification, categorization, and data of a transaction containing servlet events by presenting a user with a list of existing transactions, events, and transactions instances, providing a user interface to choose specific transaction and event instances for rule definition, and prompting the user with various options for creating a rule set for a transaction or event.

Many of the business transactions to which the herein disclosed system and method may apply are conducted over public networks, such as the Internet. Such transactions typically involve a customer making a purchase from a supplier, where the customer initiates the transaction to acquire certain goods or services, the supplier verifies the transaction, and then the supplier delivers the goods or services. These Internet-based business transactions typically span multiple components such JVMs or CLRs, queues and networks. These transactions can be synchronous or asynchronous. In the asynchronous case, data items are typically put in a queue and processing is performed once the component reading from the queue is ready to do so.

Examples of such transactions include stock purchases from a broker, book, DVD, or ticket purchases from an on-line retailer, hotel reservations from a hotel chain or purchasing services from an e-business. Whether a customer buys a book online or enrolls in an online course, the order event (i.e., a request) triggers a work flow of the information through multiple modules: for example, customer account management, billing, packaging and shipping, procurement, and customer service. In these Web applications, servlets may be used to dynamically generate HTTP responses and return HTML content to Web browsers on the server side. Servlets often are used to validate and process HTML form submissions and control a series of user interactions in a Web application. Servlets can be used to control all aspects of the request and response exchange between a Web browser and the server. Execution in each request can generate subsequent work flows, with attendant subsequent requests.

A stock trading (purchase) is typical of a business transaction (i.e., a Web application) that is conducted over the Internet. FIG. 1 illustrates an example of such a business transaction. In FIG. 1 a stock trading business application accepts trade orders from a customer and puts these orders in a queue. To meet reliability and scaling requirements, large systems may use physically separate (or dispersed) modules executing on multiple machines (including virtual machines and actual machines) to process these requests and to produce responses. Thus, the trading application may include several sub-applications or routines, each of which may execute on a physically separate platform or virtual machine.

A queue typically is the entry point to an application, and the same is true of the trading application. The trading application backend includes the routines for processing the order (request) and sending a reply (response) back to the customer once the order has been fulfilled. Because the trading application, like many other Internet-based applications, spans multiple components residing on different physical systems, the orders the trading application executes are made up of a chain of requests from one component to another. In this scenario, stock trading orders are processed asynchronously and it is important for the business to know the flow across the various components and the latency of the orders being processed.

In the stock trading example, a customer 2 desires to purchase publicly-traded securities from stock broker 20 and so initiates a business transaction 4. The customer 2 accesses the Internet 30 using the customer's browser 8 to connect to a trading application 24 at the stock broker's Web site 22. Thus, the business transaction 4 is actually a specific instance of a stock purchase transaction enabled by the trading application 24. The customer 2 places an order 6 (i.e., a server request) using a user interface (not shown) from the stock broker's Web site. The order 6 may provide for transfer of funds from the customer 2 to the stock broker 20. At the Web site 22, a server processes the order 6 and sends an acknowledgement 26 to the customer 2. The actual processing of the order 6 may involve more than one step: for example, the order 6 may be sent to a first application server where the order is initially processed. After this initial processing, the first application server may send a second server request to a second application server, where the order 6 is verified. After verification, the second application server may send a third server request to a third application server, where an order confirmation is created and sent back to the customer 2. The actual transfer of the purchased stock may occur simultaneously with the acknowledgement, or at some later time. If the stock transfer occurs at a later time, the server may send a transfer complete statement to the customer. Thus, the order 6 generates three distinct server requests, each of which may be monitored by a data collector, and each of which may result in the capture of specific event data.

An organization may have many reasons to monitor its business transaction and gather data relevant to the transaction, not the least of which is to ensure customer satisfaction with the transaction. Part of that monitoring may involve classifying transactions according to a rule set.

The disclosed system receives business transaction and event instance data from data collectors that are deployed as remote monitors. The collected data may be provided in a variety of formats, the disclosed system may use a Java™ bean processing framework that converts the data into an XML format, and uses this format for subsequent processing. The resulting business transaction then can be expressed in a uniform XML format.

Figure 2:
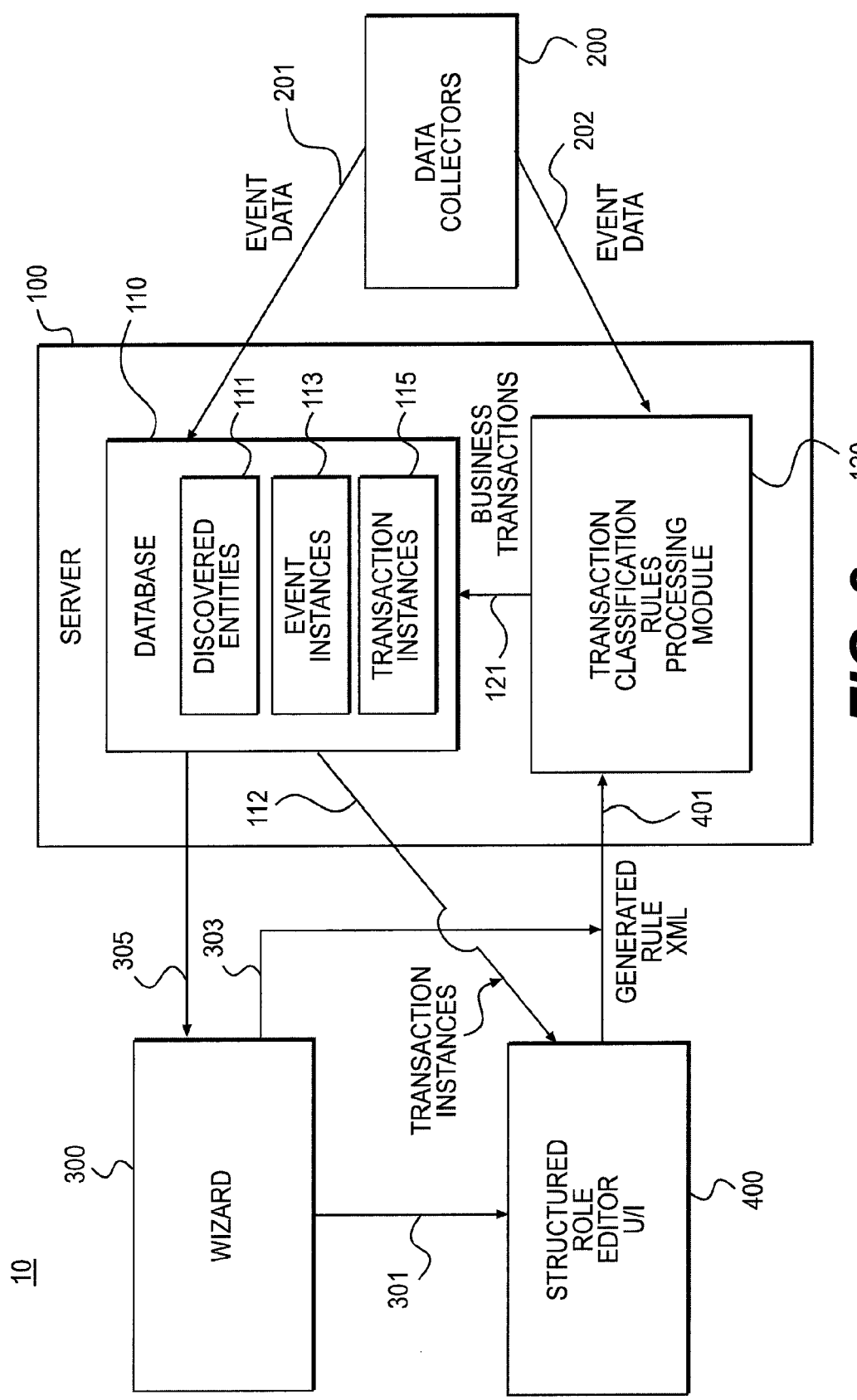
FIG. 2 illustrates an example of a system that generates classification rules for transactions.

FIG. 2 illustrates an example of a system 10 for classifying transactions. In FIG. 2, transaction classification rule generation system 10 is seen to include server 100, data collectors 200 that provide inputs to server 100, and wizard 300, which couples to the server 100 and to user interface 400. The data collectors 200 are devices that provide data from events 201, 202 to the server 100 through an automated discovery process. The data collectors 200 may be autonomous agents installed on specified components (hardware or software components). The server 100 includes database 110 and transaction classification rules processing module 120. The processing module 120 may include both processors and memory; the memory stores data and programming and the processor executes the programming. For example, the processing module memory may contain rules and programming for applying the rules, and the processor within the processing module 120 uses the programming to apply the rules to events 202 as those events are collected and transmitted by the data collectors 200. The database 110 includes tables or files for discovered entities 110, event instances 113, and transaction instances 115. The data inputs to the database 110 are provided by the data collectors 200. The discovered entities 111 are those entities that the data collectors 200 "discover" and report on. Event instances 113 are individual events (e.g., the invocation of a particular servlet call). Transactions are groupings of like events, and a transaction instance refers to a unique grouping of similar events (e.g., an individual bond transaction by a trading establishment). Thus, there may be a transaction instance for bond sales, and the bond sales transaction instance may be composed of a number of bond sale events. The processing module 120 is used to apply rules for classification of a transaction or event to each received transaction or event (event 202). However, in the absence of any such rules populating the processing module 120, events and transactions will be stored in the database 110 as unclassified entries. When the processing module 120 is populated with rules, the received events 202 are classified and then stored in the database 110 as classified event and transaction instances (i.e., business transactions 121).

The wizard 300 in conjunction with the user interface 400 generates the rules 401 that the processing module 120 applies to the event data 202. More specifically, the wizard 300 allows a user to extract certain event and transaction instances from the database 110, and to select appropriate data fields by which the rules 401 ultimately are generated. To carry out this function, the wizard 300 contains various processing modules to extract and process data 305 from the data sources stored in the database 110 and display drivers to form user interface 400 displays of data 301 for a human user to view and make selections. The user interface 400 also receives data 112 directly from the database 110, and the wizard 300 provides direct inputs 303 to the processing module 120.

Figure 3:
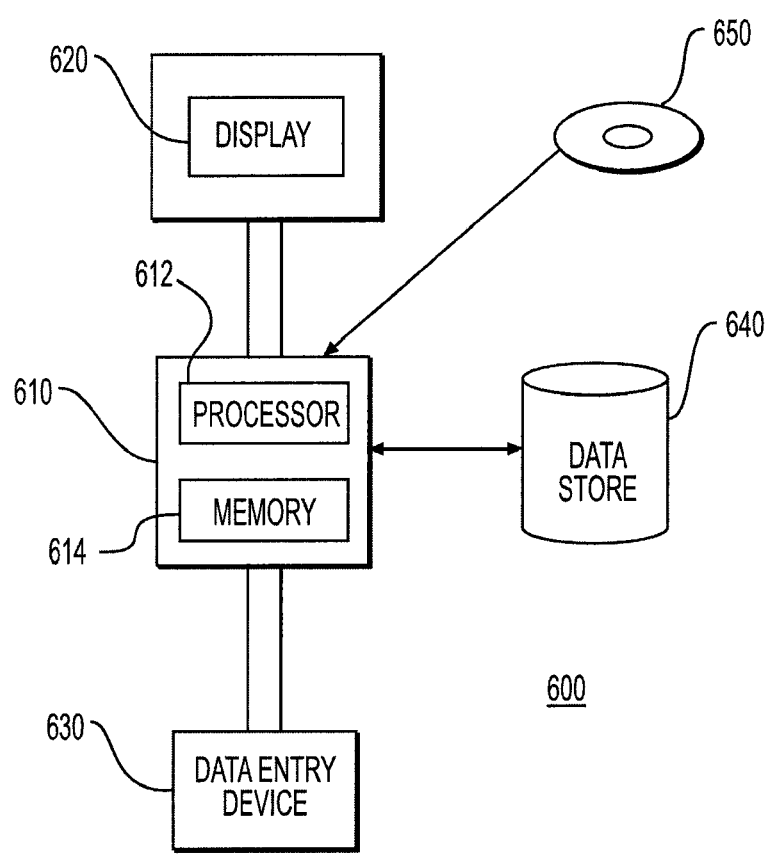
FIG. 3 illustrates an example of a computer system that generates transaction classification rules.
Figure 4:
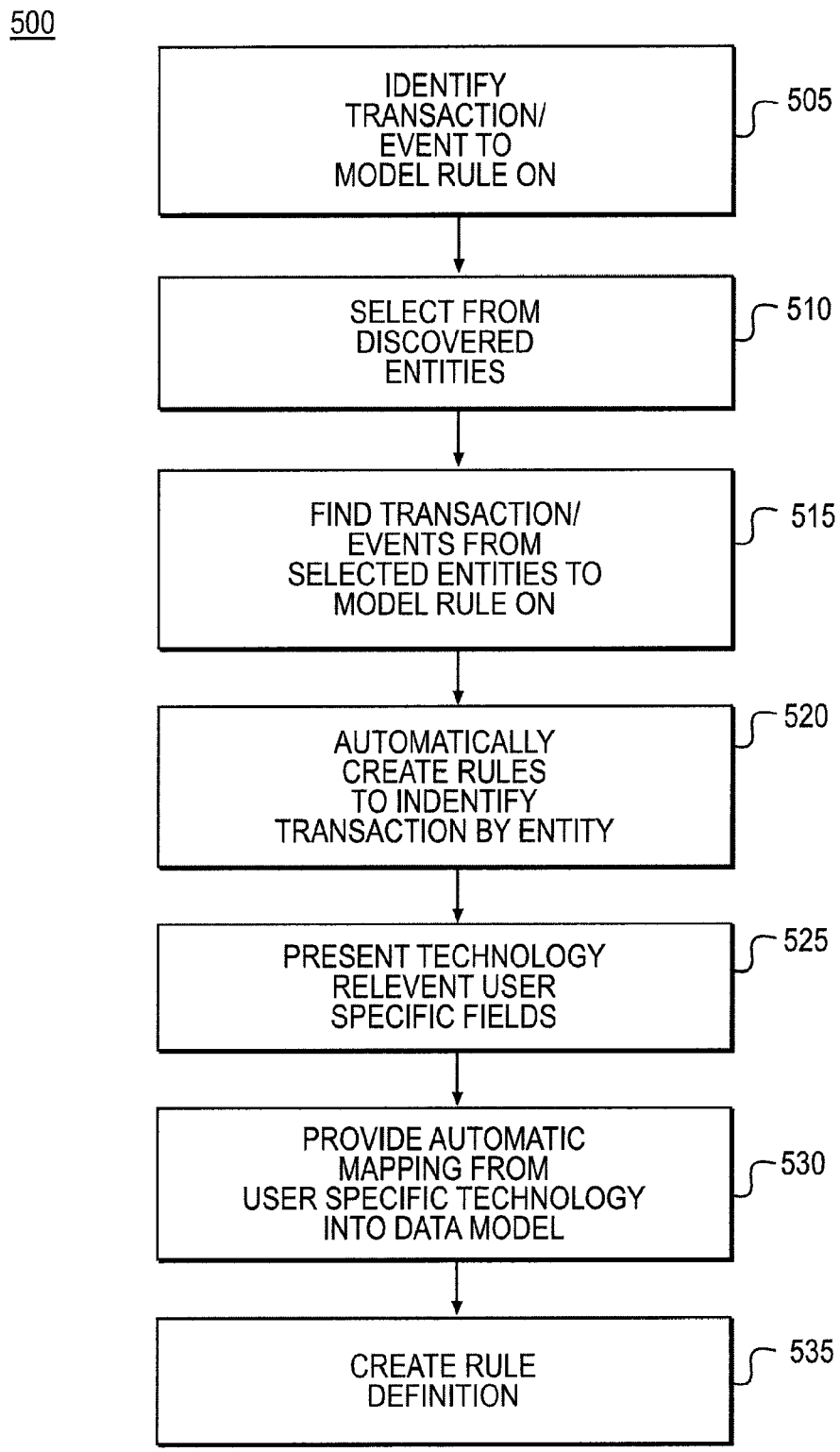
FIG. 4 illustrates an example operation using the example system of FIG. 2.

As one skilled in the art will recognize, the arrangement of components in the system 10 may be changed without affecting the overall function and performance of the system 10, or the function and performance of specific components. For example, the wizard 300, user interface 400, and server 100 may be components of a single computer or may be distributed components of a computer system. FIG. 3 illustrates an example of a computer system that implements the herein disclosed transaction classification rule generation. In FIG. 3, computer system 600 includes computer 610 to which are coupled display 620, data entry device 630, and data store 640. The computer 610 includes processor 612 and memory 614. The memory 614 may be a random access memory (RAM). The display 620 may be any typical computer display that is capable of displaying the user interface 400. The data entry device 630 may be a keyboard. The data store may be a typical computer storage device such as a hard drive. Also shown in FIG. 4 is removable computer readable medium 650. The removable computer readable memory 650 may be an optical disk. The removable computer readable medium may be inserted into the computer 610 to transfer some of all the data, programming, and files contained on the removable computer readable memory 650 to the memory 614 and/or the data store 640 as appropriate. The removable computer readable medium 650 may store the data, files, and programming needed to generate transaction classification rules and apply those rules to event and transaction instances.

Returning to FIG. 2, the system 10 allows the creation of business transaction rules, and subsequent event and transaction classification, based on at least two general use cases. First, in a domain knowledge driven case, given an identity of a specific object (servlet, queue, or other infrastructure component), a classification rule may be generated around the specific object. In this case, the wizard 300 builds a classification scheme around infrastructure components, and optionally presents a list of already discovered entities relevant to the technology of the specific object. For example, if the specific object is a servlet, the wizard 300 would return a list of servlets, web applications, application servers, and host infrastructure types.

In a second use case, given an unclassified set of events or an unclassified transaction, the wizard 300 provides a mechanism to create a classification rule for the transaction. The mechanism in this use case is similar to that in the domain knowledge case, but instead of being driven by discovered entities, the mechanism uses data from transaction instances as a model by examining the contents of all events composing the selected transaction. This includes pulling in all such infrastructure entities that occur within the transaction or its individual events. Being driven off transaction instance data also allows provision of a mechanism specific to payload and technology-specific based event data, such as XML payload, parameters, headers, etc. Optionally, the wizard 300 uses a combination of the above two use cases to drive a comprehensive workflow for creating a rule definition based on a specific technology (in the illustrated example, servlet technology). An overview of the mechanism includes the wizard 300: 1) querying the database 110 to determine which discovered entities to present to the user for building classification rules; and 2) browsing transaction instances in the database 110 and inferring from their contents likely fields that the user would employ in order to identify a transaction and create data mapping rules. The mechanism is explained below in more detail with reference to FIG. 4, which shows an example of a rules building process.

In FIG. 4, rule generation process 500 begins in block 505 with the wizard 300 receiving, by way of the user interface 400, a set of criteria that the user provides for selecting a transaction; and in response, the wizard 300 extracting a list of existing transactions from the database 110 and sending the list to the user interface 400 for display to the user in the form of a table or menu from which the user can select a desired transaction. The displayed transactions in the table also include links to the underlying events that comprise the transactions so that the user can "drill down" to individual events, if desired. Block 505 concludes when the user selects a specific transaction (and optionally a specific event), and sends the selected transaction to the wizard 300 using the user interface 400.

Block 505, 510, and 515 may be executed in one or more optional sequences in which some block elements may be skipped, or executed in different orders. In an example, in block 510 the user may request the wizard to display a list of discovered entities (e.g., servlets). The servlet list may be displayed by servlet name or by servlet URI, or both lists may be displayed on the user interface 400. This request may be used in conjunction with block 505 so that only those servlets that pertain to the selected transaction are selected by the wizard 300 for display to the user using the user interface 400. In another example, block 505 is skipped all together, and the wizard 300 displays a list of discovered entities, un-narrowed by a previously-selected transaction. The user then has the option to select a specific servlet from the presented list to use for building a business transaction rule.

Assuming the process 500 began with block 505, after completion of block 510, the process moves to block 520. However, if the process 500 began with block 510, then the user has the option of completing block 515. In block 515, with a servlet selected by the user from a discovered entities list provided by the wizard 300, the user may select a transaction or event appropriate for the selected servlet as presented by the wizard 300 to the user using the user interface 400. Specifically, the wizard 300 may, for the selected servlet, return a list of unclassified transaction related to the selected servlet. The returned list may be filterable by time period or other criteria. The selected transaction from block 515 then is used as a model for building a business transaction classification rule.

Following block 515, the process 500 moves to block 520 and the wizard 300 creates rules to identify a transaction by its association with a specific discovered entity. In block 525, the wizard 300 provides the user with the option to include additional information from the transaction being modeled and/or from other discovered entities, including: 1) servlet specific payload data, such as parameters, headers, and XML data content; and 2) other discovered entities, including hosts, application servers, and web applications, for example. Optional selection of additional information in block 525 may result in corresponding classification conditions being added to the generated rule (i.e., added to the generated rule 401 of FIG. 2).

Next, the process 500 moves to block 530, the wizard 300 provides automatic mapping from the user-specified technology (servlets) into a transaction instance. Similar to block 525, in block 530, data may be aggregated from all events in the selected transaction. FIG. 5 is an example of a user interface display provided by the wizard 300 in conjunction with the operations of block 530. In FIG. 5, user interface display 410 is shown to include an overall menu section 412 from which a user can select a specific processing block for execution by the wizard 300. In FIG. 5, the user has selected "Map Transaction Data . . . from Request Parameters," and a resulting table 414, "Set Transaction Data from Servlet Parameters" is displayed. Also as can be seen, the user has selected parameter type "Response Header=orderid," and in response, the wizard 300 displays pull down menu 416 from which the user can select a transaction data path.

Returning to process 500 of FIG. 4, in block 535, the wizard 300 creates a classification rule definition that automatically classifies transactions specified by the user, displays a summary of the rule, and sends the rule is sent to the processing module 120 for classification of future transaction instances. FIG. 6 illustrates an example of a user interface display that provides rule summary information to the user. In FIG. 6, summary display 420 provides the classification rule (i.e., "This transaction is classified when:"), the transaction metrics, and the data mappings.

What is claimed is:

1. A method, executed by a processor, for generating a transaction classification rule, comprising:
    storing a transaction as unclassified in the absence of a classification rule for the transaction until a processing module of a transaction classification system is populated with the classification rule;
    receiving an identification, from a user and with a user interface (UI) of the transaction classification system, of the existing unclassified transaction upon which the classification rule will be based;
    generating an identification rule to identify subsequent unclassified transactions as similar to the existing unclassified transaction;
    using the identification rule to identify the subsequent unclassified transactions;
    receiving an indication, from the user and with the UI, of a specific web application technology indicated by the user;
    generating the classification rule using the identified transaction, wherein the classification rule is associated with the user-specified web application technology; and
    storing the classification rule for application to the subsequent unclassified transactions, wherein application of the generated classification rule to the subsequent unclassified transactions produces transactions classified according to the classification rule.

2. The method of claim 1, comprising receiving a list of discovered entities upon which the existing and subsequent transactions may execute.

3. The method of claim 2, wherein receiving the list of discovered entities includes receiving servlets.

4. The method of claim 3, wherein receiving the list of discovered entities includes receiving one or more of hosts, web applications, and application servers.

5. The method of claim 3, comprising:
    receiving a selection of parameters related to servlets, and modifying the generated classification rule based on values of the received parameters.

6. The method of claim 1, comprising:
    generating a list of data mappings relevant to the identified unclassified transaction; and
    receiving a selection from the list of data mappings.

7. The method of claim 1, comprising generating the classification rule in XML format.

8. A computer readable medium including programming for execution by a processor, the programming when executed by the processor, implemented to:
    store a transaction as unclassified in the absence of a classification rule for the transaction until a processing module of a transaction classification system is populated with the classification rule;
    receive an identification, from a user and with a user interface (UI) of the transaction classification system, of a discovered entity upon which the classification rule will be based;
    generate an identification rule to identify the unclassified transactions relevant to the identified discovered entity;
    receive an indication, from the user and with the UI, of a specific web application technology indicated by the user;
    generate the classification rule using the identified unclassified transactions, wherein the classification rule is associated with the user-specified web application technology; and
    store the classification rule for application to the unclassified transactions, wherein application of the generated classification rule to the unclassified transactions produces transactions classified according to the classification rule.

9. The computer readable medium of claim 8, wherein the discovered entities include servlets.

10. The computer readable medium of claim 9, implemented to:
    receive a selection of parameters related to servlets, and modify the generated classification rule based on values of the received parameters.

11. The computer readable medium of claim 9, wherein the list of discovered entities includes one or more of hosts, web applications, and application servers.

12. The computer readable medium of claim 11, wherein the classification rule is generated based on parameter values related to the hosts, web applications and application servers.

13. The computer readable medium of claim 8, implemented to:
    generate a list of data mappings relevant to the identified unclassified transactions; and
    receive a selection from the list of data mappings.

14. The computer readable medium of claim 13, wherein the generated transaction rule includes data mapping information.

15. The computer readable medium of claim 8, wherein the generated classification rule is in XML format.

16. A system for generating transaction classification rules, comprising:
    a memory storing a wizard that, when executed by a processor:
    stores a transaction as unclassified in the absence of a classification rule for the transaction until a processing module of a transaction classification system is populated with the classification rule;
    receives an identification, from a user and with a user interface (UI) of the transaction classification system, of the existing unclassified transaction upon which the classification rule will be based,
    generates an identification rule to identify subsequent unclassified transactions as similar to the existing unclassified transaction,
    receives an indication, from the user and with the UI, of a specific web application technology indicated by the user; and
    generates the classification rule using the identified transaction, wherein the classification rule is associated with the user-specified web application technology; and
    a rules processing module stored in the memory that, when executed by the processor, applies the classification rule to the subsequent unclassified transactions, wherein application of the generated classification rule to the unclassified transactions produces transactions classified according to the classification rule.

17. The system of claim 16, wherein the wizard receives a list of discovered entities that are used in execution of the unclassified transaction, and wherein the wizard generates the classification rule based on the discovered entities.

18. The system of claim 17, wherein the discovered entities comprise servlets.

19. The system of claim 16, wherein the wizard:
generates a list of data mappings relevant to the identified unclassified transaction;
receives a selection from the list of data mappings; and
includes the data mappings in the transaction classification rule.

20. The system of claim 16, wherein the lists are provided to a user for selection using a user interface.

* * * * *